United States Patent [19]
Glass

[11] Patent Number: 5,897,894
[45] Date of Patent: Apr. 27, 1999

[54] MICROWAVE POPCORN WITH COARSE SALT CRYSTALS AND METHOD OF PREPARATION

[75] Inventor: Brian E. Glass, Maple Grove, Minn.

[73] Assignee: General Mills, Inc., Minneapolis, Minn.

[21] Appl. No.: 08/998,751

[22] Filed: Dec. 29, 1997

[51] Int. Cl.⁶ .................................................. A23L 1/18
[52] U.S. Cl. ............................ 426/89; 426/102; 426/107; 426/113; 426/121; 426/124; 426/126; 426/234; 426/243; 426/625; 426/627; 426/398; 426/395; 426/401; 426/412
[58] Field of Search ............................ 426/89, 102, 107, 426/113, 121, 124, 126, 234, 243, 625, 627, 398, 395, 401, 412; 219/727; 383/113

[56]                References Cited
            U.S. PATENT DOCUMENTS

| 3,851,574 | 12/1974 | Katz et al. . |
| 3,973,045 | 8/1976 | Brandberg et al. ..................... 426/110 |
| 4,096,281 | 6/1978 | Young et al. . |
| 4,385,076 | 5/1983 | Crosby ..................................... 426/533 |
| 4,450,180 | 5/1984 | Watkins . |
| 4,548,826 | 10/1985 | Watkins . |
| 4,806,371 | 2/1989 | Mendenhall . |
| 4,844,921 | 7/1989 | Bakal et al. . |
| 4,904,487 | 2/1990 | LaBaw et al. . |
| 4,904,488 | 2/1990 | LaBaw et al. . |
| 4,906,490 | 3/1990 | Bakal et al. . |
| 4,960,606 | 10/1990 | Crosby . |
| 5,075,119 | 12/1991 | Mendenhall . |
| 5,190,777 | 3/1993 | Anderson et al. . |
| 5,409,729 | 4/1995 | Friesen ..................................... 426/625 |
| 5,443,858 | 8/1995 | Jensen et al. . |
| 5,463,845 | 11/1995 | Gwiazdon et al. . |
| 5,514,407 | 5/1996 | Perlman et al. . |
| 5,597,596 | 1/1997 | Henderson .............................. 426/242 |
| 5,624,703 | 4/1997 | Perlman et al. . |
| 5,688,543 | 11/1997 | Freeport et al. ........................... 426/93 |
| 5,690,853 | 11/1997 | Jackson et al. .......................... 219/727 |
| 5,695,806 | 12/1997 | Bateman . |
| 5,750,166 | 5/1998 | Schellhaass ............................... 426/93 |
| 5,753,287 | 5/1998 | Chedid et al. ............................. 426/93 |

FOREIGN PATENT DOCUMENTS

WO 95/01105   12/1995   WIPO .

Primary Examiner—Nina Bhat
Attorney, Agent, or Firm—John A. O'Toole; L. MeRoy Lillehaugen

[57]           ABSTRACT

Microwave popcorn articles which upon microwave heating provide popcorn having enlarged salt particles that provide popped popcorn more reminiscent of at-home, stove-top prepared popped popcorn. The articles comprise any conventional microwave popcorn bag, kernel popcorn, fat and salt. At least 50% of the salt is essentially characterized by an enlarged particle size having a mean particle size of >400 μm. Included are methods of preparing such microwave popcorn articles are disclosed wherein the coarse salt is added in a separate step after the fat and kernel popcorn have been added to the bag.

33 Claims, 2 Drawing Sheets

MICROWAVE POPCORN WITH COARSE SALT CRYSTALS AND METHOD OF PREPARATION

FIELD OF THE INVENTION

The present invention relates to packaged food products. More particularly, the present invention relates to microwave popcorn product articles characterized by enlarged salt crystals and to methods for filling such articles.

BACKGROUND

Popcorn is a highly popular snack food item. In the past, the at-home preparation of popcorn by the consumer involved adding kernel popcorn plus a cooking oil to a covered pot and heating until the popcorn kernels popped to make popcorn. As used herein, "kernel popcorn" refers to unpopped popcorn. The noun "popcorn" or synonymously "popped popcorn" refers herein to popped kernel popcorn. The adjective "popcorn" can refer to either. Once prepared, common, relatively coarse, table salt is a frequently added flavoring or condiment. The resultant salted popped popcorn is a familiar snack food.

More recently, microwave popcorn products have become extremely popular. At present, in the U.S., over 70 different brands of microwave popcorn products are available. In general, the more popular microwave popcorn products comprise an expandable paper bag containing a charge of kernel popcorn, fat and salt. The microwave popcorn article is adapted to be heated in a microwave oven for three to five minutes to produce the popped popcorn. More recently, improved microwave popcorn articles have been fabricated employing a metallized susceptor which facilitates the heating of the kernel popcorn-fat charge and which, in turn, leads desirably to increases in popcorn volume and decreases in unpopped kernels. Microwave popcorn articles of this type are described in detail in, for example, U.S. Pat. No. 4,450,180 (issued May 22, 1984 to J. D. Watkins and incorporated herein by reference).

Microwave popcorn articles, of course, comprise a microwave popping bag and a charge of kernel popcorn, fat, and, usually, salt. Certain early patents taught the addition of kernel popcorn, fat and salt in the form of a prefabricated toroid or doughnut shaped piece. The piece was fabricated by mixing the kernel popcorn, salt and melted fat to form a blend and the blend was allowed to cool and harden into the toroid shape desired. These circular pieces were then dropped into the desired chamber of the popcorn bag prior to final sealing. (See for example U.S. Pat. No. 4,450,180, issued May 22, 1984).

Contemporary methods of filling microwave popcorn bags, however, employ a different filling process and technique. (See, for example, U.S. Pat. No. 4,604,854 entitled Machine For Forming, Filling and Sealing Bags, issued Aug. 12, 1986 to D. W. Andreas). The microwave bags having an unsealed open end are advanced to a first kernel popcorn filling station. While being maintained in an open position, the kernel popcorn is charged to the desired channel. Thereafter, the bags are advanced to a second filling station at which the fat/salt slurry is added to the bag. Typically, the slurry is added in the form of a vertically dispensed pencil jet (i.e., a confined stream) of the slurry. Single station filling methods are also known that involve applying the fat/salt slurry as a spray onto the kernel popcorn as the kernel popcorn falls into the bag. (See, for example WO 95/01105 entitled "Reduced Fat Microwave Popcorn and Method of Preparation" published Jan. 12, 1995, or, equivalently, U.S. Pat. No. 5,960,979 issued Nov. 25, 1997) which is incorporated herein by reference. Such single station filling techniques are especially useful for the preparation of low fat microwave popcorn products.

The bags now containing both kernel popcorn and slurry are then advanced to a sealing station where the bags are provided with a top seal to complete the closure of the bag. The sealed popcorn bags are advanced to subsequent finish packaging operations which complete the folding of the bags, providing the bags with an overwrap, and inserting appropriate numbers of the bags into cartons, etc.

Whether added simultaneously with the kernel popcorn or afterwards, conventional methods involve adding the salt as part of the slurry in order to assure evenness of distribution and the minimization of the likelihood of creating hot spots due to salt clumping. Also, in order to aid suspension of the salt in the melted fat and to avoid plugging of the orifice of the pencil jet nozzle, the salt employed is in the form of a fine powder or flour salt.

The contemporary method for filling popcorn bags involving the sequentially filling (i.e., not at the same time and station) of kernel popcorn and then the slurry is well suited for those conventional microwave popcorn articles.

While employment of finely powdered salt is useful in connection with conventional microwave popcorn articles, there is a present desire for microwave popcorn products more reminiscent of "homestyle" popped popcorn seasoned by larger sized, more granular table salt. However, a variety of problems arise when such coarse crystallized salt is used in the conventional two-step sequential filling step process or a single station filling method.

A first problem can reside in the slurry viscosity. The slurry viscosity rises rapidly as more particulates are added. If an additional particulate is desired to be added to the slurry such as for flavor or mineral fortification, then addition of requisite amounts of salt to the slurry results in a slurry having a paste consistency and a viscosity too high to pump.

A second problem is plugging of the orifice of the pencil jet nozzle used to charge the slurry to the bag that can occur when a larger sized salt particle is added to the slurry. While plugging is a problem when salt alone is added to the slurry, such plugging problems are compounded when the slurry contains supplemental particulates.

Still another problem with adding coarse salt to the slurry is that coarse salt is more likely than flour salt to settle out from the slurry in the make-up kettle prior to charging the slurry to the microwave popcorn bag. As a possible result, the uniformity of the amount of salt added to the bag can vary widely. Some bags will have too much salt while others too little.

Still another problem associated with adding coarse salt to the slurry is that finished microwave popcorn articles upon subsequent microwave heating preparation might exhibit undesirable hotspots due to excessive localized salt build-ups. Such hot spots in turn can result in excessive heating and burning of the popped popcorn.

Given the state of the art as described, there is a continuing need for new and improved microwave popcorn articles of enhanced consumer appeal. Accordingly, it is an object of the present invention to provide new and improved microwave popcorn articles.

It is a further object of the present invention to provide a microwave popcorn article having a salt component wherein the salt present is characterized by an enlarged coarse particle size which upon microwave heating can provide a popped finished popcorn product more reminiscent of homestyle popped popcorn, topped with table salt.

It is a further object of the present invention to provide microwave popcorn articles which upon microwave heating produce popcorn having salt distributions which are relatively more heterogeneous within a single bag than conventionally prepared flavor salt bearing microwave popcorn but consistent homogeneous distribution from one bag to the next.

Still another object of the present invention is to provide improved commercially practical filling methods for use in manufacturing microwave popcorn products having coarse salt.

Another object of the present invention is to provide improved methods of filling microwave popcorn bags with kernel popcorn, fat, and coarse salt that minimize the problem of fouling of the orifice of the fat application pencil jet nozzle.

It has been surprisingly discovered that the above objectives can be realized and that microwave popcorn articles can be provided that exhibit novel consumer appeal. In the preferred embodiment, the present invention resides in part in the separate, sequential filling of kernel popcorn, fat and coarse salt at their individual respective filling stations. By applying the kernel popcorn/fat/salt separately in the particular sequence in combination with selecting salt of a particular particle size range, improved microwave popcorn articles are achieved. Such improved microwave popcorn articles yield organoleptic improvements in the popped product in that the product is more reminiscent of homestyle popped popcorn which is topped with table salt.

SUMMARY OF THE INVENTION

In its article aspect, the present invention relates to improved microwave popcorn articles. The present microwave popcorn articles essentially comprise a microwave popcorn bag and a charge of kernel popcorn having quantities of fat and coarse salt. The kernel popcorn component essentially comprises about 60 to 97% of the charge. The charge further essentially includes about 2 to 40% of the fat component and about 1 to 4% salt. The salt is essentially characterized by an enlarged particle size wherein at least 50% of the salt has a particle size of about 250 to 1200 $\mu$m.

In its method aspect, the present invention resides in methods for filling a microwave popcorn bag with popcorn kernels coated with a fat and salt characterized by enlarged salt crystals. The present methods comprise the steps of:

A. providing a microwave popcorn bag having a sealed bottom end, an open sealable top end defining an upper orifice and a transversely extending seal area in an open configuration and in a vertically aligned orientation;

B. filling the bag through the upper orifice defined by the open top end with a quantity of popcorn kernels and the fat slurry; thereafter C. filling the bag through the upper orifice defined by the open top end with a quantity of a particulate; and D. sealing the open top end of the popcorn bag after the bag has been filled with the quantity of popcorn kernels, the fat slurry, and the quantity of particulate.

DETAILED DESCRIPTION OF THE INVENTION

The present invention relates to improved microwave popcorn articles characterized by enlarged salt crystals and to their methods of preparation. The present microwave popcorn articles essentially comprise a microwave popcorn bag, a charge of a quantity of 1) kernel popcorn, 2) a quantity of a fat, and 3) coarse salt. Each of these article components as well as methods of filling, product use and attributes are described in detail below.

Throughout the specification and claims, percentages are by weight and temperatures in degrees Fahrenheit unless otherwise indicated.

Microwave Bag

The present microwave popcorn articles essentially comprise a conventional microwave popcorn popping bag. Useful herein for the microwave popping bag are a wide variety of microwave bags available commercially or known in the art. Useful microwave bags herein can include any conventionally useful bag for microwave popcorn products.

For example, a suitable bag widely used commercially and preferred for use herein is described in the U.S. Pat. No. 4,450,180 patent which is incorporated herein by reference. A generally similar bag is described in U.S. Pat. No. 4,548,826. Generally, the bag therein described comprises and is fabricated from a flexible sheet material having two collateral tubular sections. The sections are parallel longitudinally extending that communicate with each other at the center of the package.

Figure 1:
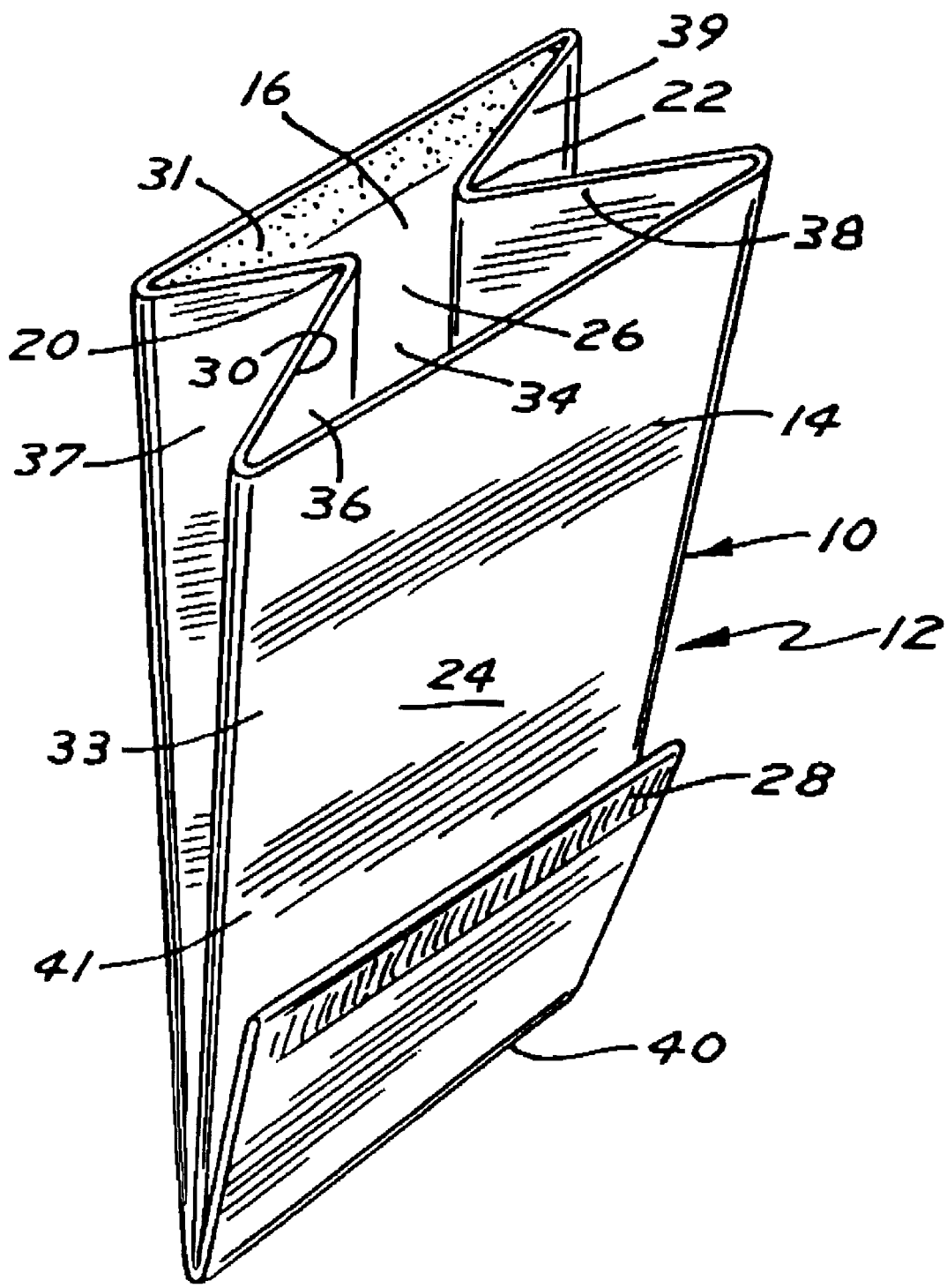
FIG. 1 is a perspective view of an unsealed, folded microwave popcorn bag.

Referring now briefly initially to FIG. 1, there is shown an embodiment of a microwave popcorn article 10 composed of a microwave bag 12 formed from flexible sheet material such as paper and being of collateral tubular configuration, that is to say, being composed of a pair of parallel longitudinally extending tubes 14 and 16 which communicate with one another along a central longitudinal opening 18. The two parallel tubes 14 and 16 are separated by longitudinally extending side indentations 20 and 22. When the package comprises a paper bag, the bag can be composed of first and second face panels 24 and 26 respectively and the indentations 20 and 22 comprises gussets. When in a vertically aligned orientation, the bag has bottom seal 28 and initially an open top or orifice 30 but a sealable seal area 31 that transversely extends the open sealable top. The sealable area can include a heat activated adhesive or a "cold seal" adhesive, as is convenient. After being filled, the top 30 is also sealed conventionally by means of heat or other suitable adhesive to provide a top seal in the top seal area 31.

The bag material is generally fabricated with multiple plies including an outer ply 33 which is generally paper, a grease-proof or resistant inner ply 34 and microwave susceptor film member or ply intermediate these inner and outer paper layers. However, in preferred embodiments the microwave susceptor is present only on one major face panel.

While tubes (or chambers, or channels) 14 and 16 can be of equal size, conventionally the susceptor channel 16 is generally slightly smaller. In such a configuration, the gussets include major left gusset face 36, minor left gusset face 37, major right gusset face 38 and minor right gusset face 39. The bag 12 can be provided with a lower transverse fold 40 to define an intermediate portion or pocket 41.

Although in the present description, a particular description is given to this preferred microwave bag, the present invention is also useful in connection with, for example, flat bottomed bags, bags with or without a bottom fold, with a straight bottom seal or other more complex bottom seal designs. Also, the present methods can be employed using new and improved microwave popcorn bag designs.

Popcorn

The present article 10 further essentially includes a quantity of kernel popcorn. Conventionally, microwave popcorn formulations are now expressed based upon the weight of the entire kernel popcorn and fat charge. This convention is followed in the present description of the invention. Broadly, the popcorn can range from about 60 to 97% of the popcorn charge. Typically, about 15 to 100 g of kernel popcorn is added to the bag, preferably about 70 to 85 g/bag for regular sized products and about 30 to 50 g/bag for "single portion" sized products. In general practice, the amount of kernel popcorn is set and the other ingredients are varied to provide full fat, reduced or low fat, and/or salted or low salt embodiments.

Conventional kernel popcorn varieties can be used herein. Highly preferred for use herein are relatively larger kernel popcorn varieties. Preferred for use herein are those larger varieties having a kernel count of about 40 to 80 kernels per 10 g, preferably 50 to 65, which are commercially available.

Fat

The present articles additionally essentially comprise a quantity or charge of an edible fat. Generally, the present methods are useful in connection with full fat, reduced-fat and with low-fat embodiments. As noted, the present invention finds particular suitability for use in connection with regular, i.e., full fat microwave products. Less preferred but nonetheless useful herein are reduced fat or low fat products. Low fat products have an even lower fat content than reduced fat embodiments. Reduced fat products have a fat content of about 8 to 15% fat. All fat percentages are descriptive of added fat and are not meant to include fat which may be included in the finished product from other ingredients, e.g., the fat from the kernel popcorn. Thus, broadly, the fat can range from about 2 to 40% and about 8 to 15%, (preferably 10 to 14%) for reduced fat embodiments. Preferred full fat products can comprise about 20 to 35% fat. In the low fat embodiments the charge essentially comprises about 2 to 8% fat, preferably 3 to 4% fat and for best results about 3.5%.

The fat, preferably semi-solid or solid fat, can be from any conventional, suitable fat(s) or oil(s) or mixtures thereof from vegetable or animal sources including from soybean, cottonseed, safflower, corn, peanut oil(s), butter oil and mixtures thereof. Liquid oils (medium chain trigycerides or interesterified oils) can be used in full or in part as a possible variation to reduced trans fatty acids oils. Liquid oils can be thickened to increase their viscosity (e.g., with silicon dioxide or by being fortified with small amounts of fat hardstock). In other variations, the oils can be partially hydrogenated. Preferred for use herein are fats which are partially hydrogenated soybean and/or corn oil. Also useful herein are tropical oils such as coconut oil and palm kernel oil, although present consumer health trends disfavor utilization of such oils.

The term slurry is used herein as is common in the microwave popcorn art to refer to any coating applied to the kernel popcorn. The term "slurry" as used generally herein thus includes fat alone; fat and a lesser portion of salt in flour form; fat, flour salt, flavors and/or color or sweetener(s); as well as any other variation or combination of ingredients used as an addition to the kernel popcorn herein.

The slurry can additionally optionally comprise minor amounts of other materials employed to make the microwave popcorn more aesthetically or nutritionally or organoleptically appealing. Such adjuvant ingredients can include, for example, sugar(s), minerals, vitamins, colorants, preservatives and flavors. If present, each of these constituents can comprise from about 0.01 to about 2% (or more for sugar, cheese solids) by weight of the fat slurry. Especially popular for use herein is a butter flavor. The flavors can be either in liquid, fat soluble forms and/or in dry powder forms such as a liquid oil absorbed onto a particulate carrier, e.g., gum arabic, starch, silicon dioxide, or dehydrated cheese solids.

The fat slurry is prepared simply by admixing the fat (in a fluid or melted state) together with any optional ingredients with salt and blending the mixture to form a stable dispersion or slurry. The fat or slurry, while still fluid (70° to 130° F.; 21° to 55° C.), is then sprayed into the microwave popcorn bag as described in detail below.

In a preferred variation, at least a portion of the fat is supplied by a low moisture butter ingredient. Suitable low moisture butter ingredients and methods of preparing microwave popcorn products therewith are described in co-pending commonly assigned U.S. Ser. No. 08/784,850 (filed Jan. 1, 1997) entitled "Shelf-Stable Butter Containing Microwave Popcorn" which is incorporated herein by reference. In general, however, the butter ingredients herein described are low moisture (i.e., less than 3%) butters that are commercially available. The fat/butter blends comprise about 200 ppm antioxidants. To assure shelf stability, the butter content is preferably limited to 10% of the added fat.

Salt

The present microwave popcorn articles additionally essentially include a salt component characterized by at least the major portion having an enlarged particle size or "coarse" salt herein.

Of course, microwave popcorn articles additionally conventionally comprise a salt component. Typically, however, in the prior art practice, the salt component is a microsized salt, also known as ultrafine salt or pulverized salt or "flour" salt, typically having a mean particle size of about 22 microns. This flour salt is simply physically admixed in with the fat component to form a fat and salt slurry. In contrast, herein, the coarse salt, or the coarse salt fraction of the total salt constituent, is added as a separate component.

Of course, the density of salt is much higher than the fat. As a result, in the practice of the prior art, the salt tends to settle out of the fat in the slurry make-up vessel. While constant agitation moderates this settling problem, the problem nonetheless remains and is aggravated as the particle size of the salt increases.

In the preferred embodiment, the coarse salt essential has a particle size ranging from about 250 to about 720 microns. A useful salt is available from Morton Salt under the trade designation "TFC 999 Fine" having a mean particle size of at least 400 $\mu$m and preferably about 440 $\mu$m.

In less preferred embodiments, a portion of the total salt can be added in the form of a flour sized particulate to the fat slurry. In those embodiments, it is preferred that the portion of the total salt added as a salt flour to the slurry be less than 40% of the total salt, preferably less than 25% of the total salt.

While in the preferred embodiment the particulate addition in the third or separate particulate addition step after the slurry has been added is coarse granulation salt, the skilled artisan will appreciate that other particulates can be added in full or partial substitution for coarse grain salt. Such particulates can include a wide variety of materials intended to provide various flavor or nutritional advantages. Such materials include sugars, dried dairy ingredients such as dried cheese solids, minerals, (e.g., $CACO_2$) and mixtures thereof.

However, in more preferred embodiments, the present microwave products are additionally characterized as being sugar free (i.e., by total mono- or disaccharide content of less than 0.5%). Such products exhibit greater shelf stability as well as minimization of sugar related scorching and burning.

In other more preferred embodiments, the present microwave products are additionally characterized as being free of a cheese constituent (i.e., having a cheese ingredient content of less than 0.5%, dry weight basis). Cheese ingredients can also undesirably contribute to scorching and burning problems in microwave popcorn products. It is believed that these problems are due to the protein and sugar (e.g., lactose) constituents thereof. Thus, dried cheeses being generally low in fat and thus high in other constituents are particularly undesirable.

In highly preferred embodiments, the present articles are both sugar(s) free and cheese ingredient free.

Method of Preparation

Figure 2:
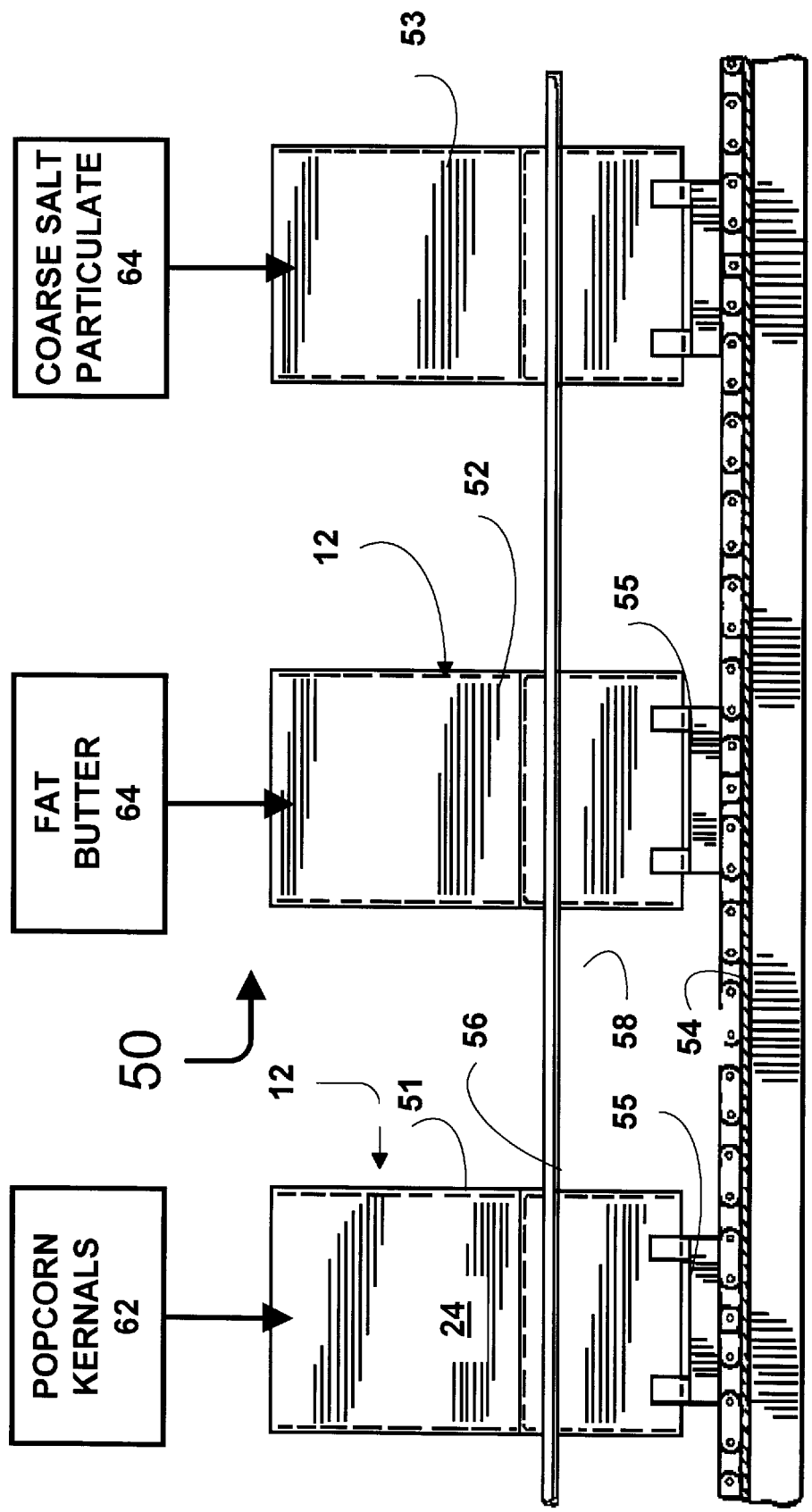
FIG. 2 is a diagramatic view of one method of filling a microwave popcorn bag in accordance with the invention.

Now referring to FIG. 2, there is seen a schematic of the method of preparation preferred for use herein generally designated by reference numeral 50. The drawing shows a conventional microwave packaging line and depicts three stations thereof designated generally by reference numbers 51, 52 and 53. In upstream stations, (not shown) the tubular bag material is cut into desired lengths, and is provided with the bottom seal 28. Additionally, in upstream stations (not depicted), the bags 12 are folded to have their bottom third folded up as depicted in first station 51 of FIG. 2 to provide the first lower transverse fold 40 so that the kernel popcorn, fat charge, and coarse particulate salt can be positioned within the bag in the desired middle portion 41 thereof. The bags 12 are advanced from station to station (left to right) by suitable drive means such as the endless drive chain 54 depicted having bag engagement clips 55. Packaging line speeds range from about 50 to 100 bags per minute. Also, the bottom third of the bags are maintained in the closed position by appropriately spaced parallel guide bars 56 and 58.

In the present method of filling microwave popcorn bags, the first station 51 is a popcorn filling station. The fat addition is charged to the bag at a second separate station 52.

Thereafter, the bags being maintained in the upright, folded orientation depicted in FIG. 2 are advanced to the third salt and/or other particulate filling station 53. The coarse salt is then charged to the bag 12 in a separate step.

Once filled with the popcorn, fat slurry and coarse salt particulate, the bags are then advanced to the sealing station (not shown) wherein the open top end is sealed such as by retractable heat or pressure sealing jaws which impart a seal in the seal area.

The filled and sealed microwave popcorn bags are then advanced to subsequent downstream packaging operations (not shown). Such subsequent downstream packaging operations include folding the bags again to provide a three-folded bag, i.e., to provide a second upper transverse fold; overwrapping the folded bags with an overwrap or moisture barrier layer; and inserting desired numbers of the packaged article into cartons.

At the filling station 51 the process involves the step 62 of filling the bag through the upper orifice with a quantity of popcorn kernels. Generally, however, the process step can conveniently be practiced at filling station 51 by employing a means for dispensing a measured quantity of kernel popcorn such as a dispensing wheel. The dispensing wheel discharges at timed intervals a measured quantity (e.g., 80 to 90 g) of the kernel popcorn into a vertically oriented filling horn or funnel. The funnel causes the kernel popcorn to fall by gravity into the bag 12.

At the second or fat slurry filling station 52, the present methods additionally include the step 64 of filling the bag 12 through the upper orifice with a quantity of fat (with or without butter). The fat application step can be practiced by employing an applicator for spraying the fat slurry (e.g., commercially available from Hibar Systems Limited, Ontario, Canada) that is supplied by a slurry supply means (not shown). The slurry supply means can conveniently include a conventional positive displacement reciprocating metering pump having a piston and a pressurized slurry inlet. The pump precisely pumps metered amounts of the fat slurry to the applicator at closely controllable time intervals.

While a pencil jet spray is preferred for use herein, equivalents thereof in terms of dispensing the slurry can also be used. For example, a multiplicity of very fine jet streams, (e.g., 3–12), or a sparge can be used to achieve the desired dispersion hereunder. Also, other spray types, (e.g., a cone spray, a mist spray, or a fan spray) are useful herein. However, great care must be taken in selecting such useful alternatives so as to avoid getting slurry in the bag seal area. In other embodiments, the spray can be gas assisted, e.g., air, steam, or inert gas.

In preferred embodiments, the bag 12 has a microwave chamber (i.e., wherein one major face panel has an intermediate microwave susceptor layer between the inner and outer bag layers) and, for cost considerations, a microwave susceptor-free chamber. In the preferred practice, the kernel popcorn, fat and salt are charged to the microwave channel. Conventionally, the microwave channel is the lesser channel (i.e., being formed by the smaller major face 24) and the greater channel is the microwave free channel. Such a configuration minimizes the amount of relatively expensive microwave susceptor material required while nonetheless providing the needed expansion volume upon microwave popping.

In the preferred form the popcorn charging and slurry addition are practiced at separate stations and as separate steps. However, in other embodiments, the kernel popcorn and slurry addition can be practiced in a single station concurrently. Apparatus and techniques for such concurrent filling of the popcorn and slurry are described in commonly assigned U.S. Pat. No. 5,690,979 (issued Nov. 25, 1997) entitled "Method Of Preparing Reduced Fat Microwave Popcorn."

At station 53, it can be seen that the present methods additionally comprise the step 66 of filling the 5 bag with a quantity of a particulate after the bag is filled with popcorn and fat.

Generally, however, the particulate filling station 53 includes a means for dispensing a measured quantity of coarse salt or other particulates such as are used for filling salt or sugar packets.

The kernel popcorn, fat, and coarse salt mixture obtained by the methods of the present invention is thus importantly characterized by the salt being heterogeneously dispersed over the surface of the kernel popcorn.

The present methods further essentially include a conventional finish step (not shown in FIG. 2) of sealing the open end of the microwave popcorn bag after the bag has been filled with the quantity of popcorn kernels, the fat and the quantity of coarse salt.

Product Use

The microwave popcorn products prepared as described can be used in a conventional manner for the at-home preparation of popcorn by microwave heating. Upon microwave heating of the sealed microwave popcorn article in a conventional home microwave oven, the popcorn exhibits more heterogeneous salt distribution more reminiscent of at-home stove top preparation of popped popcorn and excellent organoleptic attributes. The contribution of the more granular salt contributes to a unique texture and appearance (in addition to flavor) that is more reminiscent of homestyle or stove op popcorn as compared to conventional microwave popcorn.

INDUSTRIAL APPLICABILITY

The present invention finds suitability for use in the provision of a mass market, shelf stable consumer food item adapted to prepare oiled, flavored popcorn upon microwave heating.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure. It will be appreciated that other modifications of the present invention, within the skill of the microwave popcorn art, can be undertaken without departing from the spirit and scope of the invention.

EXAMPLE 1

An improved microwave popcorn article of the present invention comprising a microwave popcorn bag was prepared having the popcorn/fat charge of the composition indicated below. The microwave popcorn bag is fabricated substantially in accordance with the teachings of U.S. Pat. No. 4,450,180. Microwave popcorn articles comprising microwave popcorn bags of this type are available under the brand name Betty Crockery™/Pop Secret™. The popcorn fat charge had the following composition:

| Ingredients | Weight % |
|---|---|
| Popcorn | 63.6 |
| Fat[1] | 31.4 |
| Butter[2] | 2.0 |
| Salt | 2.8 |
| Artificial butter flavor | 0.2 |
| | 100.0% |

[1] An hydrogenated soybean oil available from Cargill Foods under the trade name 600S.
[2] Butter available from Land O'Lakes.

A supply of the fat and butter was prepared to form a warm slurry (about 122° F.; 50° C.).

A quantity of microwave popcorn bags were filled as follows:

About 67 g of popcorn was dispensed by the dispensing wheel into the funnel which in turn charged the popcorn into the upper open end of the bag.

The popcorn filled bag was then advanced to a second filling station. A fat slurry applicator was timed to dispense about 35 g of the slurry in the form of a downwardly projecting vertically aligned pencil jet spray. The duration of the spray was about 0.5 seconds. The spray charged the fat slurry within the microwave popcorn bag below the seal area.

The popcorn and fat filled bags were then advanced to a third filling station. About 3 g of salt were dropped by gravity into the open end of the bag. The coarse salt had a median size of about 406 microns with a particle size distribution of about 267 to 609 microns.

The bags were then heat sealed to form finished full fat microwave popcorn articles of the present invention.

Reduced fat and low fat microwave products of the present invention can be prepared wherein in the Example the fat and butter content are reduced in amount.

What is claimed is:

1. A method for filling a microwave popcorn bag with a food charge of popcorn kernels, a fat slurry, and a particulate, comprising the steps of:

A. providing a microwave popcorn bag having a sealed portion, an open sealable top portion defining an orifice and a seal area extending across the orifice in an open configuration and in a vertically aligned orientation;

B. filling the bag through the upper orifice with a quantity of popcorn kernels and the fat slurry;

C. filling the bag through the upper orifice with a quantity of a particulate after the bag is filled with the popcorn kernels and the fat slurry; and D. sealing the open top end of the popcorn bag after the bag has been filled with the quantity of popcorn kernels, the fat slurry, and the quantity of particulate.

2. The method of claim 1 wherein the step of filling the bag with the quantity of popcorn kernels and the fat slurry comprises the substeps of:

1. dispensing the quantity of popcorn kernels in an airborne stream; and concurrently, 2. spraying a quantity of the fat slurry into the airborne popcorn stream to coat the popcorn with the slurry.

3. The method of claim 1 wherein the step of filling the bag with the quantity of popcorn kernels and the fat slurry comprises the substeps of:

1. dispensing the quantity of popcorn kernels through the upper orifice; and 2. spraying a quantity of fat slurry through the upper orifice defined by the open top end.

4. The method of claim 3 wherein the spraying step is after the dispensing step.

5. The method of claim 1 wherein the step of filling the bag with the particulate comprises the step of filling the bag with coarse salt.

6. The method of claim 5 wherein the step of filling the bag with salt comprises the step of filling the bag with coarse salt having a particulate size of about 1200 microns.

7. The method of claim 1 wherein the step of filling the bag with the particulate comprises the step of filling the bag with the particulate having a particulate size of about 720 microns.

8. The method of claim 7 wherein the popcorn quantity ranges from about 60% to 97%;
   wherein the fat quantity ranges from about 2 to 40%, and
   wherein the salt ranges from about 1 to 4%.

9. The method of claim 8 wherein at least a portion of the fat is supplied by a low moisture butter.

10. The method of claim 9 wherein the fat includes about 200 ppm of antioxidant.

11. The method of claim 10 wherein the fat additionally includes a flour salt having a mean particle size of less than 50 microns.

12. The method of claim 11 wherein the coarse salt has a particle size of about 250 to 600 microns.

13. The method of claim 12 wherein the food charge is free of a cheese ingredient.

14. The method of claim 13 wherein the fat or slurry has a spray temperature of between about 70° to 130° F. (21° to 54.5° C.) and the fat is a material selected from the group consisting of low melting point fats, partially hydrogenated oils, fluid fats, and mixtures thereof.

15. The method of claim 14 wherein the food charge is free of added sugar(s).

16. The method of claim 15
    wherein the bag has first and second major rectangular face panels each having parallel transversely extending top and bottom edges and parallel vertically extending side edges and sections of interconnecting folded gusset material projecting centrally between the side edges of the face panels with the centrally projecting gussets approaching each other enough to divide the bag into first and second collateral tubes; and
    wherein the popcorn and fat or slurry are charged to only one collateral tube.

17. The method of claim 16
    wherein the bag includes a lower transverse fold defining an intermediate tube portion and the bag is maintained with the lower fold portion folded against the bag body; and
    wherein the bag first collateral tube has a microwave susceptor layer defining a microwave collateral tube.

18. The method of claim 15 wherein the popcorn quantity ranges from about 60 to 79% and the fat quantity ranges from about 20 to 40%.

19. A microwave popcorn article exhibiting desirable organoleptic attributes comprising,
    a continuously sealed microwave popcorn bag, and
    a food charge disposed therein of popcorn and fat uniformly dispersed upon the popcorn, said charge comprising:
        A. about 60 to 97% of the product of unpopped popcorn kernels,
        B. about 2 to 40% of the product of an edible fat,
        C. about 1 to 4% of the product of coarse salt at least 60% of which having a particle size distribution of about 250 to 700 microns.

20. The article of claim 19 wherein at least a portion of the edible fat is low moisture butter.

21. The article of claim 20 wherein said bag is formed of a flexible tubular sheet material having a sealed bottom and an open sealable upper end.

22. The article of claim 21 additionally comprising a flour salt having an average particle size of less than 50 microns.

23. The article of claim 22 wherein the food charge is free of a cheese ingredient.

24. The article of claim 23 wherein the food charge is free of sugar.

25. The article of claim 24 wherein the edible fat is a material selected from the group consisting of low melting point fats, partially hydrogenated oils, fluid fats, and mixtures thereof.

26. The article of claim 25 wherein the food charge additionally comprises a mineral supplement in particulate form.

27. The article of claim 25 wherein less than 40% of the salt is supplied by flour salt.

28. The article of claim 27 having about 15 to 100 g popcorn.

29. The article of claim 28 having about 70 to 85 g popcorn.

30. The product prepared by the process of claim 1.

31. The product prepared by the process of claim 2.

32. The product prepared by the process of claim 3.

33. The product prepared by the process of claim 5 and wherein the popcorn has a kernel count of about 40 to 80 per 10 g.

* * * * *